United States Patent
Angst et al.

(10) Patent No.: US 9,166,922 B2
(45) Date of Patent: Oct. 20, 2015

(54) COMMUNICATION DEVICE FOR AN INDUSTRIAL COMMUNICATION NETWORK WHICH CAN BE OPERATED IN A REDUNDANT MANNER AND METHOD FOR OPERATING A COMMUNICATION DEVICE

(71) Applicants: Hermann Angst, Karlsruhe (DE);
Franz-Josef Götz, Heideck (DE);
Michael Kasper, Nürnberg (DE);
Joachim Lohmeyer, Hilpoltstein (DE)

(72) Inventors: Hermann Angst, Karlsruhe (DE);
Franz-Josef Götz, Heideck (DE);
Michael Kasper, Nürnberg (DE);
Joachim Lohmeyer, Hilpoltstein (DE)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 13/869,565

(22) Filed: Apr. 24, 2013

(65) Prior Publication Data
US 2013/0286820 A1    Oct. 31, 2013

(30) Foreign Application Priority Data
Apr. 30, 2012 (EP) .................................. 12166109

(51) Int. Cl.
*H04L 12/823* (2013.01)
*H04B 1/74* (2006.01)
*H04L 12/801* (2013.01)

(52) U.S. Cl.
CPC ............... *H04L 47/32* (2013.01); *H04B 1/745* (2013.01); *H04L 47/34* (2013.01)

(58) Field of Classification Search
None
See application file for complete search history.

(56) References Cited

U.S. PATENT DOCUMENTS

| | | | |
|---|---|---|---|
| 6,400,718 B1 | 6/2002 | Kawaguchi | |
| 2012/0008530 A1* | 1/2012 | Kulkarni et al. | 370/256 |
| 2012/0236873 A1* | 9/2012 | Steindl | 370/432 |

FOREIGN PATENT DOCUMENTS

| | | |
|---|---|---|
| DE | 102008017192 | 10/2009 |
| DE | 102008017192 A1 | 10/2009 |
| EP | 1052872 A2 | 11/2000 |
| EP | 2282452 | 2/2011 |
| EP | 2282452 A1 | 2/2011 |
| EP | 2343857 | 7/2011 |
| EP | 2343857 A1 | 7/2011 |
| EP | 2413538 | 2/2012 |
| EP | 2413538 A1 | 2/2012 |

OTHER PUBLICATIONS

PROFIBUS Nutzeroganisation e.V. PNO, "PROFINET System Description—Technology and Application," Jun. 2011, pp. 1-22.*

* cited by examiner

*Primary Examiner* — Donald Mills
(74) *Attorney, Agent, or Firm* — Cozen O'Connor

(57) ABSTRACT

A communication device for an industrial communication network which can be operated in a redundant manner comprises a first and a second transmitting and receiving unit that transmit data packets in a bumpy or bumpless manner inside the industrial communication network and are selectively changeable over to a bumpy or bumpless transmission mode. An evaluation unit is connected to the first and/or second transmitting and receiving unit(s) and detects data packets to be transmitted in the bumpy or bumpless manner inside the industrial communication network. Redundancy handling and filter units for received redundant data packets are deactivated when a data packet to be transmitted in the bumpy manner is detected. A memory unit is assigned to the first and/or second transmitting and receiving unit(s) and buffers at least one data packet to be transmitted in the bumpy manner during a predefined period of time in the bumpy transmission mode.

20 Claims, 2 Drawing Sheets

COMMUNICATION DEVICE FOR AN INDUSTRIAL COMMUNICATION NETWORK WHICH CAN BE OPERATED IN A REDUNDANT MANNER AND METHOD FOR OPERATING A COMMUNICATION DEVICE

BACKGROUND OF THE INVENTION

1. Field of the Invention

In distributed industrial automation systems, it is necessary to ensure, when acquiring, evaluating and transmitting measurement and control data, that complete and unchanged data are present in real time, i.e., in time-critical industrial production processes. Intentional or unintentional changes or changes caused by a technical fault should be avoided because they may result in inconsistent system states and system failures with economically serious downtimes within an industrial automation system.

2. Description of the Related Art

An industrial automation system usually comprises a multiplicity of automation devices networked to one another via an industrial communication network and is used to control or regulate installations, machines or devices within the scope of production or process automation. On account of time-critical boundary conditions in technical systems automated using industrial automation systems, real-time communication protocols, such as Profinet, Profibus or real-time Ethernet, are predominantly used for communication between automation devices in industrial communication networks.

Interruptions of communication connections between computer units of an industrial automation system or automation devices may result in undesirable or unnecessary repetition of the transmission of a service request. This gives rise to additional utilization of communication connections of the industrial automation system, which may result in further system disruptions or faults. A particular problem in industrial automation systems regularly results from message traffic having a relatively large number of, but relatively short, messages, thus intensifying the above problems.

In order to be able to compensate for failures of communication connections or devices, communication protocols, such as Media Redundancy Protocol, High-availability Seamless Redundancy or Parallel Redundancy Protocol, have been developed for highly available industrial communication networks that can be operated in a redundant manner. The Media Redundancy Protocol (MSR) is defined in the International Electrotechnical Commission (IEC) standard 62439 and makes it possible to compensate for individual connection failures in networks having a simple ring topology during bumpy redundant transmission of data packets. According to the Media Redundancy Protocol, a redundancy manager is assigned to a switch having two ports inside the ring topology, which redundancy manager monitors the network for connection failures and possibly initiates a switching measure to close the ring. In the normal operating state, the redundancy manager uses test data packets to check whether an interruption has occurred inside the ring topology. However, the switch assigned to the redundancy manager normally does not forward data packets containing useful data from one port to the other. Data packets containing useful data are therefore prevented from permanently circulating inside the ring topology. If a switch or a connection fails inside the ring topology, test data packets transmitted by a port are no longer received at the respective other port. The redundancy manager can use this to detect a failure and, in the event of a failure, forward data packets containing useful data from one port to the other and vice versa, in contrast to the normal operating state. In addition, the redundancy manager causes the remaining switches to be informed of a topology change caused by a failure. This avoids data packets from being transmitted via the failed connection.

Bumpy media redundancy methods can be implemented, in principle, with relatively little effort. However, the disadvantage is that, on the one hand, messages may be lost in the event of a fault and, on the other hand, a fault state is first of all present during reconfiguration of a communication network. Such a fault state must be safeguarded via a superimposed communication protocol, for example using TCP/IP on the network or transport layer, in order to avoid an interruption in a communication connection.

PROFINET (IEC 61158 Type 10) also refers to the Media Redundancy Protocol as a bumpy media redundancy method inside a communication network with a ring topology. In contrast, Media Redundancy Planned Duplication (MRPD) is an extension for bumpless transmission of isochronous real-time data. However, Media Redundancy Planned Duplication is not an application-neutral bumpless media redundancy method but rather a PROFINET-specific extension.

High-availability Seamless Redundancy (HSR) and the Parallel Redundancy Protocol (PRP) are defined in the IEC 62439-3 standard and make it possible to bumplessly transmit data packets in a redundant manner with extremely short recovery times. According to High-availability Seamless Redundancy and the Parallel Redundancy Protocol, each data packet is duplicated by a transmitting communication device and is sent to a receiver on two different paths. A communication device at the receiver end filters redundant data packets constituting duplicates from a received data stream.

DE 10 2008 017 192 A1 describes a method for setting up a network comprising a first network subscriber with a set of ports. These ports are connected to ports of further network subscribers of the network. In a first method step, the ports assigned to the first network subscriber are switched to a first operating mode. In the first operating mode, test messages can be received and transmitted via the ports. According to a further method step, test messages are transmitted via the ports assigned to the first network subscriber. In addition, the ports assigned to the first network subscriber are switched to a second operating mode if no test message of the transmitted test messages is re-received by the first network subscriber. In the second operating mode, messages that are received via one of the ports assigned to the first network subscriber are forwarded via the remaining ports. This makes it possible to avoid the formation of network loops when networking or expanding complex networks.

EP 2 282 452 A1 describes a method for transmitting data inside a ring-type communication network, in which the data are transmitted according to High-availability Seamless Redundancy and the communication network comprises at least one master node, a source node and a destination node. Each node has a first communication interface and a second communication interface with a respective first neighboring node and a second neighboring node. In addition, each node receives data frames via the first communication interface and forwards the received data frame, either in changed or unchanged form, via the second communication interface without an additional delay. The master node transmits a first redundant data frame and a second redundant data frame or an empty data packet to its first or second neighboring node. Upon receiving the two redundant data frames, the source node fills the respective data frame with process data in a predetermined reserved area. Each filled data frame is then immediately and individually forwarded to the first or second neighboring node of the source node. The destination node finally extracts the process data from the first received filled data frame of a pair of redundant data frames.

EP 2 343 857 A1 describes a network node for a communication network comprising a first subnetwork and a second subnetwork connected to the first subnetwork. Whereas data are transmitted according to a spanning tree protocol in the first subnetwork, a second protocol that differs from the protocol used in the first subnetwork is used to transmit data in the second subnetwork. The network node described in EP 2 343 857 A1 is set up as an element for the second subnetwork and for communication inside the second subnetwork. In addition, the network node is set up as a spanning tree main node for monitoring and controlling the second subnetwork by means of a spanning tree functionality. As a result, the second subnetwork can be handled as a virtual network node by the spanning tree protocol used in the first subnetwork.

EP 2 413 538 A1 discloses a method for redundant communication in a communication system comprising a plurality of communication networks. The communication networks are connected to one another via at least one coupling node. Data that originate from a first communication network are prevented from being transmitted back to the first communication network from a second communication network based on an item of information defined before data transmission.

SUMMARY OF THE INVENTION

It is an object of the present invention to provide a communication device for an industrial communication network which can be operated in a redundant manner, which makes it possible, on the one hand, to avoid connection dropouts in time-critical applications and, on the other hand, to handle redundancy in applications that are not time-critical with a reduced amount of effort, and a method for operating such a communication device.

This and other objects and advantages are achieved in accordance with the invention by providing a method for an industrial communication network which is operable in a redundant manner, where the communication device comprises at least one first and one second transmitting and receiving unit each having an interface for a network connection of the industrial communication network. Both transmitting and receiving units have an identical network address and an identical device identifier. A signal processing unit is connected to the first and second transmitting and receiving units for bumplessly transmitting data inside the industrial communication network. The signal processing unit has a multiplexer unit for forwarding data packets to be transmitted to both transmitting units in a parallel manner and a redundancy handling unit for processing data packets received by both receiving units. A data packet may be, for example, a frame on the data link layer, a packet on the network layer or a segment on the transport layer. The redundancy handling unit comprises a filter unit that is configured to detect received redundant data packets.

In addition, the first and/or second transmitting and receiving unit(s) is/are configured, according to the invention, both for bumpy and for bumpless data transmission inside the industrial communication network and can be selectively changed over to a bumpy or bumpless transmission mode. An evaluation unit is connected to the first and/or second transmitting and receiving unit(s) and is configured to detect data packets to be transmitted in a bumpy or bumpless manner inside the industrial communication network. In this case, a data packet to be transmitted in a bumpy or bumpless manner has an identification for a respective transmission mode at least in a predetermined data field. Furthermore, the redundancy handling unit and the filter unit are deactivated when a data packet to be transmitted in a bumpy manner is detected. In addition, a memory unit is assigned to the first and/or second transmitting and receiving unit(s) and is configured to buffer at least one data packet to be transmitted in a bumpy manner during a predefined period of time in the bumpy transmission mode.

As a result of an ability to selectively change over to a bumpy transmission mode and a bumpless transmission mode, the communication device according to the invention overall makes it possible, on the one hand, to prevent excessive delays in time-critical messages to be transmitted in a bumpless manner, particularly in the case of a high network load. On the other hand, the memory unit for buffering data packets to be transmitted in a bumpy manner can be dimensioned to be smaller by subdivision into data packets to be transmitted in a bumpless manner and in a bumpy manner.

The communication device according to the invention may comprise, for example, a communication module, a component of a modular automation device for controlling or regulating installations, machines or devices. In addition to a communication module, such a modular automation device may accommodate one or more additional or functional modules to provide or expand functionalities of the automation device. Such additional or functional modules may be, for example, input/output modules, energy supply modules or a central control module. In this case, installations, machines or devices to be controlled or regulated may be connected to input/output modules, communication modules or a central control module. In this case, a central control module may be, in particular, a permanent component of a modular automation device. In addition, a modular automation device may also comprise outsourced control units, which are referred to as decentralized peripherals, or control units arranged close to the process.

A backplane bus for serial or parallel data transmission, for example, may be provided for communication connections between the additional or functional modules of a modular automation device. The additional or functional modules are advantageously fastened to the automation device in a releasable manner. As soon as an additional or functional module is fastened to the backplane bus, it can be addressed by other additional or functional modules via the backplane bus, preferably in real time.

The communication device according to the invention may be configured for use in both wired and wireless networks. For example, the communication device according to the invention may have an Ethernet interface, a WLAN interface, an interface for a HART network or a wireless HART network or an interface for a field bus system such as Profinet or Profibus.

According to one advantageous embodiment of the communication device according to the invention, the signal processing unit is configured to allocate a sequence number to a data packet to be transmitted in a bumpy manner and/or to insert an item of redundancy information in a data packet to be transmitted in a bumpless manner only if a data packet to be transmitted in a bumpless manner is detected. This makes it possible to deliberately avoid processing effort needed to handle redundancy in data packets to be transmitted in a bumpless manner in data packets that are transmittable in a bumpy manner. Accordingly, the redundancy handling unit is preferably configured to filter duplicates only if a data packet to be transmitted in a bumpless manner is detected.

According to one preferred embodiment of the invention, the industrial communication network has a ring topology. In addition, a monitoring and control unit is provided in this case and is configured to detect an interruption inside the ring topology using transmitted test data packets. The monitoring and control unit is also advantageously configured to control forwarding of data packets containing useful data, which are addressed to a first connection of the first and/or second transmitting and receiving unit(s), to a second connection of the first and/or second transmitting and receiving unit(s). This makes it possible to implement redundancy handling methods for data packets to be transmitted in a bumpless manner with little effort.

According to one particularly preferred embodiment of the communication device according to the invention, data packets to be transmitted in a bumpy or bumpless manner are identified by a respective entry in an Ethertype field of an Ethernet data frame. This enables reliable and simple detection of data packets to be transmitted in a bumpy or bumpless manner and the corresponding handling thereof. In addition, identification of a data packet as a data packet to be transmitted in a bumpy or bumpless manner may be dependent on a communication protocol to be respectively applied at the data link layer. This enables simple and rapid subdivision into data packets to be transmitted in a bumpy manner and data packets to be transmitted in a bumpless manner. Data packets to be transmitted in a bumpless manner are preferably assigned a higher priority than data packets to be transmitted in a bumpy manner. This further reduces a risk of delayed transmission of a data packet to be transmitted in a bumpless manner. A particular unproblematic implementation results if data packets to be transmitted in a bumpless manner are each assigned a VLAN tag with a priority of 6 according to the Institute of Electrical and Electronic Engineers (IEEE) standard 802.1Q.

According to another advantageous embodiment of the communication device according to the invention, at least one network connection connected to the signal processing unit via a coupling element is provided for an automation device. In addition, the signal processing unit may be connected to the coupling element via a first and a second interface. In this case, the first interface is provided for transmitting data packets received by the first receiving unit, while the second interface is provided for transmitting data packets received by the second receiving unit. The redundancy handling unit preferably additionally comprises an identification unit that is configured to insert a redundancy indicator in a received redundant data packet. In this case, the redundancy handling unit is configured to forward data packets received by both receiving units to the coupling element without buffering. This dispenses with previously conventional complete buffering of received data packets by the signal processing unit or redundancy handling unit, including the management of buffered data packets.

In accordance with the method according to the invention for operating a communication device in a redundant industrial communication network, the communication device comprises at least one first and one second transmitting and receiving unit each having an interface for a network connection of the industrial communication network. In this case, both transmitting and receiving units have an identical network address and an identical device identifier. A signal processing unit is connected to the first and second transmitting and receiving units for bumplessly transmitting data inside the industrial communication network, which signal processing unit forwards data packets to be transmitted to both transmitting units in a parallel manner and detects redundant data packets received by the receiving units.

In addition, the first and/or second transmitting and receiving unit(s) transmit(s) data packets in a bumpy or bumpless manner inside the industrial communication network in accordance with the method according to the invention and is/are selectively changed over to a bumpy or bumpless transmission mode. An evaluation unit is connected to the first and/or second transmitting and receiving unit(s) and detects data packets to be transmitted in a bumpy or bumpless manner inside the industrial communication network. In this case, a data packet to be transmitted in a bumpy or bumpless manner has an identification for a respective transmission mode at least in a predetermined data field, which identification is evaluated by the evaluation unit. Furthermore, a redundancy handling unit for processing data packets received by both receiving units and a filter unit for detecting received redundant data packets are deactivated when a data packet to be transmitted in a bumpy manner is detected. In addition, a memory unit is assigned to the first and/or second transmitting and receiving unit(s) and buffers at least one data packet to be transmitted in a bumpy manner during a predefined period of time in the bumpy transmission mode.

The method according to the invention therefore, on the one hand, reduces delays in time-critical messages to be transmitted in a bumpless manner. On the other hand, a memory unit of smaller dimensions may be used to buffer data packets to be transmitted in a bumpy manner.

The signal processing unit preferably allocates a sequence number to the data packet to be transmitted in a bumpy manner and/or inserts an item of redundancy information in the data packet to be transmitted in a bumpless manner only if a data packet to be transmitted in a bumpless manner is detected. Accordingly, in accordance with another embodiment of the method according to the invention, the redundancy handling unit filters duplicates from received redundant data packets only if a data packet to be transmitted in a bumpless manner is detected.

The industrial communication network may have a ring topology, for example. In this case, a monitoring and control unit is advantageously provided and detects an interruption inside the ring topology using transmitted test data packets. In addition, the monitoring and control unit may control forwarding of data packets containing useful data, which are addressed to a first connection of the first and/or second transmitting and receiving unit(s), to a second connection of the first and/or second transmitting and receiving unit(s).

According to one advantageous embodiment of the method according to the invention, data packets to be transmitted in a bumpy or bumpless manner are identified by a respective entry in an Ethertype field of an Ethernet data frame. For example, data packets may be identified as data packets to be transmitted in a bumpy or bumpless manner in a manner dependent on a communication protocol to be respectively applied at the data link layer. Furthermore, data packets to be transmitted in a bumpless manner may be assigned a higher priority than data packets to be transmitted in a bumpy manner. This results in a reduced risk of delayed transmission of a data packet to be transmitted in a bumpless manner.

According to another embodiment of the method according to the invention, at least one network connection connected to the signal processing unit via a coupling element is provided for an automation device. In this case, the redundancy handling unit comprises an identification unit that respectively inserts a redundancy indicator in received redundant data packets and forwards data packets received by both receiving units to the coupling element without buffering. This dispenses with complete buffering of received data packets by the signal processing unit or redundancy handling unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below in an exemplary embodiment using the drawing, in which.

DETAILED DESCRIPTION OF THE PREFERRED EMBODIMENTS

Figure 1:
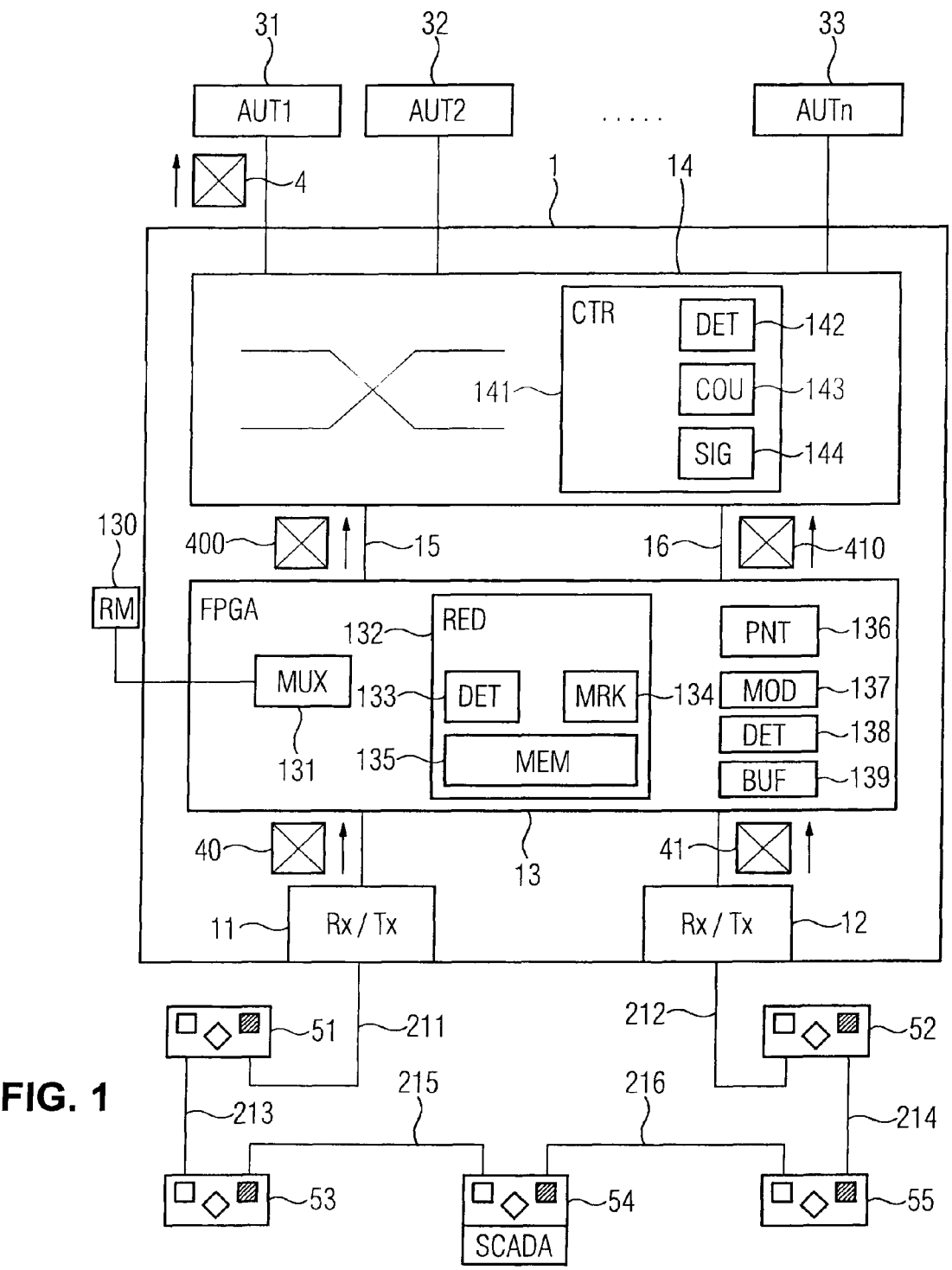
FIG. 1 shows a schematic illustration of a communication device for an industrial communication network that is operable in a redundant manner.

FIG. 1 illustrates an industrial communication network 2 which, in addition to a communication device 1 described in detail below, comprises a plurality of network nodes 51-55 connected to one another in a ring structure via network connections 211-216. These may include, for example, a network node 54 that is assigned to a supervisory control and data acquisition (SCADA) system of an industrial production or process automation system.

The communication device 1 for an industrial communication network 2 that is operable in a redundant manner comprises a first transmitting and receiving unit 11 and a second transmitting and receiving unit 12 each having an interface for a network connection 211, 212 of the industrial communication network 2. The two transmitting and receiving units 11, 12 have an identical network address and an identical MAC address. A signal processing unit 13 implemented by a Field Programmable Gate Array (FPGA) is connected to the first and second transmitting and receiving units 11, 12 inside the industrial communication network 2. For transmitting data in a bumpless manner, the signal processing unit 13 has a multiplexer unit 131 for forwarding data packets to be transmitted to both transmitting units 11, 12 in a parallel manner and a redundancy handling unit 132 for processing data packets 40, 41 received by both receiving units 11, 12. The redundancy handling unit 132 comprises a filter unit 133 that is configured to detect received redundant data packets.

The first and second transmitting and receiving units 11, 12 are configured to transmit data either in a bumpy or in a bumpless manner inside the industrial communication network 2 and is selectively changeable over to a bumpy or bumpless transmission mode by an operating mode selection unit 137 assigned to the signal processing unit 13. An evaluation unit 138 is also assigned to the signal processing unit 13 and detects data packets to be transmitted in a bumpy or bumpless manner inside the industrial communication network 2. In this case, a data packet to be transmitted in a bumpy or bumpless manner has an identification for a respective transmission mode at least in a predetermined data field, which identification is evaluated by the evaluation unit 138.

Data packets to be transmitted in a bumpy or bumpless manner are identified by a respective entry in an Ethertype field of an Ethernet data frame. Data packets are preferably identified as data packets to be transmitted in a bumpy or bumpless manner based on a communication protocol to be respectively applied at the data link layer (layer 2 according to the ISO/OSI communication model). In order to avoid transmission delays, data packets to be transmitted in a bumpless manner are assigned a higher priority than data packets to be transmitted in a bumpy manner. For example, data packets to be transmitted in a bumpless manner are each assigned a VLAN tag with a priority of 6 according to the IEEE 802.1Q standard.

The redundancy handling unit 132 and the filter unit 133 are deactivated by the operating mode selection unit 137 if a data packet to be transmitted in a bumpy manner is detected. The signal processing unit 13 also comprises a memory unit 139 that buffers data packets to be transmitted in a bumpy manner for a predefined period of time in the bumpy transmission mode for the first and second transmitting and receiving units 11, 12.

In the present exemplary embodiment, the signal processing unit 13 is assigned a redundancy manager 130 that detects an interruption inside the ring topology of the communication network 2 using transmitted test data packets and controls forwarding of data packets containing useful data, which are received by the first transmitting and receiving unit 11, to the second transmitting and receiving unit 12. This is effected, for example, according to the Media Redundancy Protocol or a functionally comparable communication protocol.

A plurality of automation devices 31-33 are connected to the signal processing unit 13 via a coupling element 14 implemented by a backplane switch. The coupling element 14 having an assigned controller 141 is connected to the automation devices 31-33 via an interlink connection in each case. The signal processing unit 13 additionally has a memory unit 136 which stores a table (proxy node table) containing details relating to all automation devices 31-33 connected to the coupling element 14.

The signal processing unit 13 implemented using a Field Programmable Gate Array is connected to the coupling element 14 via a first interface 15 and a second interface 16. In this case, the first interface 15 is provided solely for transmitting data packets 40 received by the first receiving unit 11 in the bumpless transmission mode, while the second interface 16 is provided solely for transmitting data packets 41 received by the second receiving unit 12 in the bumpless transmission mode. Only one of the two interfaces 15, 16 is used during bumpy transmission. This is controlled by the operating mode selection unit 137.

The redundancy handling unit 132 assigned to the signal processing unit 13 comprises an identification unit 134 that is configured to insert a redundancy indicator in a received redundant data packet 40, 41 in the bumpless transmission mode. In the present exemplary embodiment, a data packet comprises at least one data frame. The redundancy indicator is formed in the bumpless transmission mode by inserting an invalid date in a data frame. In addition, in the bumpless transmission mode, the signal processing unit 13 forwards data packets 40, 41 received by both receiving units 11, 12 to the coupling element 14 without buffering. According to the present exemplary embodiment, a redundant data packet is rejected only in the coupling element 14 in the bumpless transmission mode.

The data packets 40, 41 received by both receiving units 11, 12 differ from data packets 400, 401 forwarded to the coupling element 14 via the first and second interfaces 15, 16 in the bumpless transmission mode only in terms of a duplicate, to be precise by an inserted invalid date. The redundancy handling unit 132 filters duplicates from received redundant data packets only if a data packet to be transmitted in a bumpless manner is detected. In a corresponding manner, the signal processing unit 13 allocates a sequence number to the data packet to be transmitted in a bumpy manner and inserts an item of redundancy information in the data packet to be transmitted in a bumpless manner only if a data packet to be transmitted in a bumpless manner is detected.

In principle, it is sufficient if a memory unit 135 assigned to the signal processing unit 13 stores only sequence numbers of data packets that have already been received in an error-free manner in the bumpless transmission mode. In order to identify received redundant data packets in the bumpless transmission mode, the signal processing unit 13, upon receiving a new data packet, simply checks its sequence number for a match with a sequence number that has already been stored. Redundancy indicators in received data packets, such as an invalid date, are preferably evaluated in the bumpless transmission mode by a detection unit 142 that is assigned to the controller 141 of the coupling element 14 and rejects data packets containing redundancy indicators. This can be effected, for example, based on a cyclic redundancy check (CRC).

A counter unit 143 that records data packets that are received in an error-free and erroneous manner is also assigned to the controller 141 of the coupling element 14. An evaluation unit 144 assigned to the controller 141 of the coupling element 14 signals an error-free redundant network state if a difference between data packets received in an error-free and erroneous manner is below a predefinable threshold value. Data packets received in an erroneous manner are preferably determined using a cyclic redundancy check.

With an increasing number of data packets received in an error-free manner and a simultaneously substantially stagnating number of data packets received in an erroneous manner, the evaluation unit 144 signals a network state with a loss of redundancy. The evaluation unit 144 signals a network failure with a stagnating number of data packets received in an error-free and erroneous manner.

Figure 2:
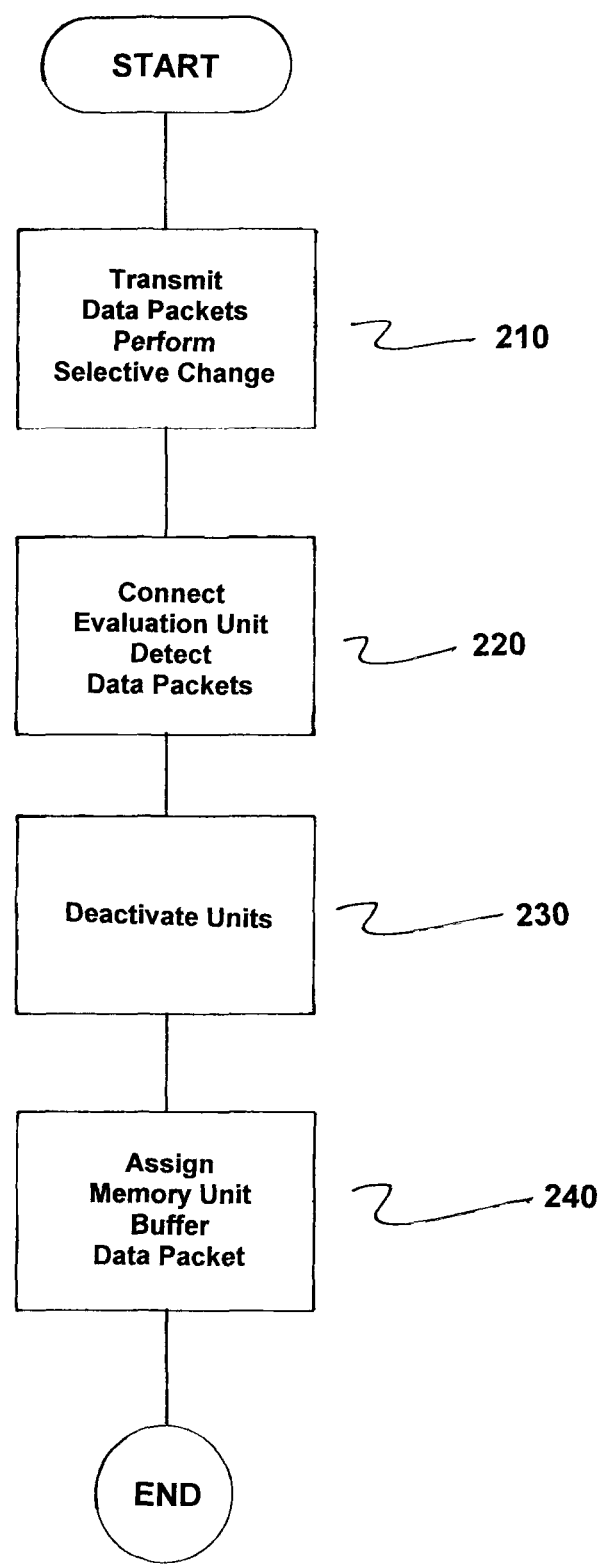
FIG. 2 is a flowchart of the method in accordance with the invention.

FIG. 2 is a flowchart of a method for operating a communication device in a redundant industrial communication network, where the communication device includes at least one first transmitting and receiving unit and one second transmitting and receiving unit each having an interface for a network connection of the industrial communication network, the least one first transmitting and receiving unit and one second transmitting and receiving units include an identical network address and an identical device identifier, where a signal processing unit is connected to the at least one first and second transmitting and receiving units for bumplessly transmitting data inside the industrial communication network, and the signal processing unit forwards data packets to be transmitted to the at least one first and second transmitting units in a parallel manner and detects redundant data packets received by the receiving units.

The method comprises transmitting data packets, by at least one of the at least one first and second transmitting and receiving units in a bumpy or bumpless manner inside the industrial communication network and selectively changing over the at least one first and second transmitting and receiving units to a bumpy or bumpless transmission mode, as indicated in step 210.

Next, an evaluation unit is connected to at least one of the at least one first and second transmitting and receiving units, and data packets to be transmitted in a bumpy or bumpless manner inside the industrial communication network are detected, as indicated in step 220. Here, a data packet to be transmitted in the bumpy or bumpless manner includes an identification for a respective transmission mode at least in a predetermined data field, where the identification is evaluated by the evaluation unit.

Next, a redundancy handling unit for processing data packets received by the first and second receiving units and a filter unit for detecting received redundant data packets are deactivated when a data packet to be transmitted in the bumpy manner is detected, as indicated in step 230.

A memory unit is then assigned to at least one of the at least one first and second transmitting and receiving units and at least one data packet to be transmitted in the bumpy manner is buffered during a predefined period of time in the bumpy transmission mode, as indicated in step 240.

The features of the exemplary embodiments described above can be implemented both individually and in the described combination with one another.

Thus, while there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A communication device for an industrial communication network operable in a redundant manner, comprising:

at least one first transmitting and receiving unit and at least one second transmitting and receiving unit, each of the at least one first and second transmitting and receiving units having an interface for a network connection of the industrial communication network, and having an identical network address and an identical device identifier;

a signal processing unit connected to the at least one first and second transmitting and receiving units for seamlessly transmitting data inside the industrial communication network, the signal processing unit having a multiplexer unit for forwarding data packets to be transmitted to the at least one first and second transmitting units in a parallel manner and a redundancy handling unit for processing data packets received by the at least one first and second receiving units, and the redundancy handling unit comprising a filter unit configured to detect received redundant data packets, at least one of the at least one first and second transmitting and receiving units being configured to implement seamless and non-seamless data transmission inside the industrial communication network and being selectively changeable over to a seamless or non-seamless transmission mode;

an evaluation unit connected to the at least one of the at least one first and second transmitting and receiving units and being configured to detect data packets to be transmitted in a seamless or non-seamless manner inside the industrial communication network, a data packet to be transmitted in the seamless or non-seamless manner having an indentification for a respective transmission mode at least in a predetermined data field, the redundancy handling unit and the filter unit being deactivated when data packet to be transmitted in the seamless manner is detected; and a memory unit assigned to at least one of the at least one first and second transmitting and receiving unit, and configured to buffer at least one data packet to be transmitted in a manner during a predefined period of the time in the seamless transmission mode;

wherein data packets to be transmitted in the seamless manner are assigned a higher priority than a data packets to be transmitted in the non-seamless manner.

2. The communication device as claimed in claim 1, wherein the signal processing unit is configured to at least one of allocate a sequence number to a data packet to be transmitted in a seamless manner and insert an item of redundancyinformation in a data packet to be transmitted in the non-seamless manner only if a data packet to be transmitted in the non-seamless manner is detected.

3. The communication device as claimed in claim 2, wherein the redundancy handling unit is configured to filter duplicates only if a data packet to be transmitted in the non-seamless manner is detected.

4. The communication device as claimed in claim 1, wherein the redundancy handling unit is configured to filter duplicates only if a data packet to be transmitted in the non-seamless manner is detected.

5. The communication device as claimed in claim 1, wherein the industrial communication network has a ring topology, and further comprising:

a monitoring and control unit configured to detect an interruption inside the ring topology using transmitted test data packets and to control forwarding of data packets containing useful data, which are addressed to a first connection of at least one of the at least one first and second transmitting and receiving units, to a second connection of at least one of the at least one first and second transmitting and receiving units.

6. The communication device as claimed in claim 1, wherein data packets to be transmitted in the seamlessor or non-seamless manner are identified by a respective entry in an Ethertype field of an Ethernet data frame.

7. The communication device as claimed in claim 1, wherein identification of a data packet as a data packet to be transmitted in the seamless or non-seamless manner is dependent on a communication protocol to be respectively applied at a data link layer.

8. The communication device as claimed in claim 1, wherein data packets to be transmitted in a non-seamless manner are each assigned a VLAN tag with a priority of 6 in accordance with Institute of Electrical and Electronic Engineers (IEEE) standard 802.1Q.

9. The communication device as claimed in claim 1, wherein at least one network connection connected to the signal processing unit via a coupling element is provided for an automation device.

10. The communication device as claimed in claim 9, wherein the signal processing unit is connected to the coupling element via a first and a second interface, the first interface being transmitting data packets received by the first receiving unit, and the second interface being transmitting data packets received by the second receiving unit.

11. The communication device as claimed in claim 10, wherein the redundancy handling unit comprises an identification unit configured to insert a redundancy indicator in a received redundant data packet, the redundancy handling unit being configured to forward data packets received by both receiving units to the coupling element without buffering.

12. The communication device as claimed in claim 9, wherein the redundancy handling unit comprises an identification unit configured to insert a redundancy indicator in a received redundant data packet, the redundancy handling unit being configured to forward data packets received by both receiving units to the coupling element without buffering.

13. A method for operating a communication device in a redundant industrial communication network, the communication device having at least one first transmitting and receiving unit and one second transmitting and receiving unit each having an interface for a network connection of the industrial communication network, the at least one first transmitting and receiving unit and one second transmitting and receiving units each having an identical network address and an identical device identifier, a signal processing unit being connected to the at least one first and second transmitting and receiving units for seamlessly transmitting data inside the industrial communication network, the signal processing unit forwarding data packets to be transmitted to the at least one first and second transmitting units in a parallel manner and detecting redundant data packets received by the receiving units, the method comprising:

transmitting data packets, by at least one of the at least one first and second transmitting and receiving units in a seamless or non-seamless manner inside the industrial communication network and selectively changing over the at least one first and second transmitting and receiving units to a seamless or non-seamless transmission mode;

connecting an evaluation unit to at least one of the at least one first and second transmitting and receiving units and detecting data packets to be transmitted in a seamless or non-seamless manner inside the industrial communication network, a data packet to be tranmitted in the seamless or non-semless manner having an identification for a respective transmission mode at least in a predetermined data field, the identification being evaluated by the evaluation unit;

deactivating a redundancy handling unit for processing data packets received by the first and second receiving units and a filter unit for detecting received redundant data packets when a data packet to be transmitted in the seamless manner is detected;

assigning a memory unit to at least one of the at least one first and second transmitting and receiving units and buffering at least one data packet to be transmitted in the seamless manner during a predefined period of time in the seamless transmission mode;

wherein data packets to be transmitted in the non-seamless manner are assigned a higher priority than data packets to be transmitted in the seamless or non-seamless manner.

14. The method as claimed in claim 13, wherein the signal processing unit at least one of allocates a sequence number to the data packet to be transmitted in a seamless manner and inserts an item of redundancy information in the data packet to be transmitted in the non-sealess manner only if the data packet to be transmitted in a non-seamless manner is detected.

15. The method as claimed in claim 14, wherein the redundancy handling unit filters duplicates from received redundant data packets only if a data packet to be transmitted in a non-seamless manner is detected.

16. The method as claimed in claim 13, wherein the redundancy handling unit filters duplicates from received redundant data packets only if a data packet to be transmitted in a non-seamless manner is detected.

17. The method as claimed in claim 13, wherein the industrial communication network has a ring topology, the method further comprising:
   detecting, by a monitoring and control unit, an interruption inside the ring topology using transmitted test data packets and controlling forwarding of data packets containing useful data, which are addressed to a first connection of at least one of the at least one first and second transmitting and receiving units, to a second connection of at least one of the at least one first and second transmitting and receiving units.

18. The method as claimed in claim 13, wherein data packets to be transmitted in the seamless or non-seamless manner are identified by a respective entry in an Ethertype field of an Ethernet data frame.

19. The method as claimed in claim 13, wherein data packets are identified as data packets to be transmitted in the seamless or non-seamless manner in a manner dependent on a communication protocol to be respectively applied at a data link layer.

20. The method as claimed in claim 13, wherein at least one network connection connected to the signal processing unit via a coupling element is provided for an automation device, and wherein the redundancy handling unit comprises an identification unit which respectively inserts a redundancy indicator in received redundant data packets and forwards data packets received by the at least one first and second receiving units to the coupling element without buffering.

* * * * *